United States Patent [19]

McDougall

[11] Patent Number: 5,047,216

[45] Date of Patent: Sep. 10, 1991

[54] APPARATUS FOR RECOVERING ELEMENTAL SULPHUR

[75] Inventor: David W. McDougall, Calgary, Canada

[73] Assignee: Delta Projects Inc., Calgary, Canada

[21] Appl. No.: 158,527

[22] Filed: Feb. 22, 1988

[51] Int. Cl.$^5$ .............................................. C01B 17/04
[52] U.S. Cl. .................................. 422/160; 137/599.1; 137/625.43; 137/625.48; 137/625.5; 423/574 R
[58] Field of Search ....................... 422/160, 114, 115; 423/574 R; 137/571, 572, 625, 625.43, 625.48, 625.5, 599.1

[56] References Cited

U.S. PATENT DOCUMENTS

| | | | |
|---|---|---|---|
| 1,736,803 | 11/1929 | Shields et al. | 137/599.1 |
| 2,758,447 | 8/1956 | Prosek | 137/599.1 X |
| 2,782,610 | 2/1957 | Martin | 137/599.1 |
| 2,898,202 | 8/1959 | Houdry et al. | 422/115 |
| 2,920,653 | 1/1960 | Wolff | 137/625.43 |
| 3,722,525 | 3/1973 | Epple | 137/625.43 X |
| 3,833,710 | 9/1974 | Deschamps et al. | 423/574 R |
| 3,908,688 | 9/1975 | Gandrud | 137/599.1 X |
| 4,406,306 | 9/1983 | Kolze | 137/625.43 |
| 4,466,457 | 8/1984 | Brane et al. | 137/599.1 |
| 4,469,131 | 9/1984 | Traylor | 137/599.1 |
| 4,469,134 | 9/1984 | Kanai et al. | 137/625.43 |
| 4,487,754 | 12/1984 | Reed | 422/115 X |
| 4,623,001 | 11/1986 | Vogler et al. | 137/625.43 X |
| 4,684,514 | 8/1987 | Chen | 423/574 R |
| 4,795,620 | 1/1989 | Heisel et al. | 423/574 R |
| 4,805,666 | 2/1989 | Araki et al. | 137/599.1 X |
| 4,827,979 | 9/1989 | Boddy | 137/599.1 X |

FOREIGN PATENT DOCUMENTS 0972284 10/1964 United Kingdom .................... 55/31

Primary Examiner—Robert J. Warden
Assistant Examiner—Amalia L. Santiago
Attorney, Agent, or Firm—Rogers, Bereskin & Parr

[57] ABSTRACT

A piping arrangement for two or three Claus catalytic converters and condenser sets used for recovering sulphur from gas streams containing hydrogen sulphide. One of the converters is operated at a sub-dewpoint temperature while the other(s) is(are) operated at a higher temperature for regenerating the catalyst. The piping arrangement includes two four-way switching valves that allow an influent gas stream to be switched between the two converters without leaving stagnant gas in the piping.

4 Claims, 7 Drawing Sheets

APPARATUS FOR RECOVERING ELEMENTAL SULPHUR

FIELD OF THE INVENTION

This invention relates to an apparatus for recovering elemental sulphur from a gas stream containing hydrogen sulphide, by the "Claus" process.

BACKGROUND OF THE INVENTION

The Claus process essentially involves the catalytic conversion of hydrogen sulphide to sulphur and water. The process is widely used to eliminate sulphur compounds from gas streams as a pollution control measure. At the same time, the process is commercially attractive because it results in the production of a saleable sulphur product. A primary use of the Claus process is to remove hydrogen sulphide from acid gas streams that result from oil refining processes. In this application, hydrogen sulphide is oxidized to sulphur dioxide and the hydrogen sulphide and sulphur dioxide react to produce elemental sulphur and water. The process is carried out at high temperature in a catalytic converter containing activated alumina catalyst.

It has been recognized that, if the Claus process is carried out at temperatures below the dewpoint of the sulphur that is produced (e.g. about 230° C. to 116° C.), conversion to sulphur increases substantially. However, as the reaction proceeds and sulphur is adsorbed into the catalyst in the converter, the effectiveness of the catalyst is reduced and the catalyst must be periodically regenerated. A second catalytic converter is therefore provided so that the catalyst in one converter can be regenerated while the other is operated at the dewpoint for sulphur recovery. Regeneration can take place "on-line" by directing into the converter the full forward flow of the gas stream, which is at high temperature. This causes the sulphur that was previously condensed on the catalyst to be vapourized. The vapourized sulphur is recovered downstream in a separate condenser.

An enhancement to this process involves the provision of three catalytic converters instead of two. In this process one catalytic converter is in regeneration and two converters are operated below the dewpoint. Again, regeneration takes place by directing into the relevant converter the full forward flow of the gas stream, which is at high temperature. The addition of the extra converter operating below the dewpoint provides overall higher levels of sulphur recovery.

DESCRIPTION OF THE PRIOR ART

In a typical sub-dewpoint acid gas treatment unit housing two converters and two condensers and using on-line regeneration, six two-way switching valves are required to permit the gas flow to be switched between the two converters for permitting on-line regeneration of the cataylst. Each of the six switching valves must be accessible for maintenance and maintenance platforms must be provided (which is expensive).

When the converters are operating normally (one at a sub-dewpoint temperature and one at a high temperature for regenerating the catalyst) three of the two-way valves are closed and three are open. During switching of the gas stream from one converter to the other, a previously closed valve is opened and a previously open valve is closed until all six valves have changed position.

A corresponding installation having three converters and three condensers and using on-line regeneration would have nine two-way switching valves.

As a result of the piping configurations used, there are always sections of piping between the converters and condensers that contain stagnant gases. These stagnant gases contain trace quantities of sulphur trioxide. If the gas stream is allowed to cool to the acid dewpoint, the sulphur trioxide combines rapidly with water (which is always present in the gas) to form sulphuric acid. The sulphuric acid molecules have an affinity for water so that the concentrations of sulphuric acid that occur are very corrosive to steel and to almost all plastics as well as to concrete, castables, gunites and mortar. Only a very small amount of sulphur trioxide is required in the stagnant gas stream to form a fairly concentrated acid.

To prevent acid formation during plant shutdown, inert purge gas is flowed through all lines to ensure that no acid can condense. However, purge gas cannot be used during normal operation of the plant. Therefore, sections of pipe which will contain stagnant gas are heat traced and insulated to prevent the gas from dropping below the acid dewpoint. The heat tracing on these lines is expensive and is provided solely for the purpose indicated.

SUMMARY OF THE INVENTION

An object of the present invention is to provide an improved apparatus and method for recovering elemental sulphur gas from a gas stream that is intended to avoid the problems outlined above.

The apparatus provided by the invention includes at least two Claus catalytic converter and condenser sets, each comprising a converter containing a catalyst and a condenser. Each set has an inlet connection to the converter and an outlet connection from the condenser. A two-position four-way switching valve is provided in association with each converter and condenser set. Each valve has two inlets and two outlets and provides two mutually isolated flow paths from the inlets to the outlets, and the valve is switchable between a first position in which each inlet is coupled to a defined one of said outlets, and a second position in which the outlets are reversed. The converter and condenser sets and valves are coupled with the gas stream and with an exhaust by piping so that, in use, a first one of the valves receives gas from the stream through a first one of its inlets and can be set to deliver gas selectively through either outlet to the inlet connection of one of the converter and condenser sets, while the second valve can be set to receive gas selectively through either of its inlets from the outlet connection of either converter and condenser set, and can deliver the gas selectively to exhaust or to the second inlet of the first valve.

This arrangement allows the valves to be set so that the incoming gas stream can be delivered to any selected one of the converters to regenerate its catalyst while the output from that converter is circulated through the other converter or converters for sulphur recovery. At the same time, gas will always be flowing in the piping so that there is no stagnant gas under normal operating conditions; hence no acid can form, and heat tracing is not required.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF THE PRIOR ART APPARATUS

Figure 1:
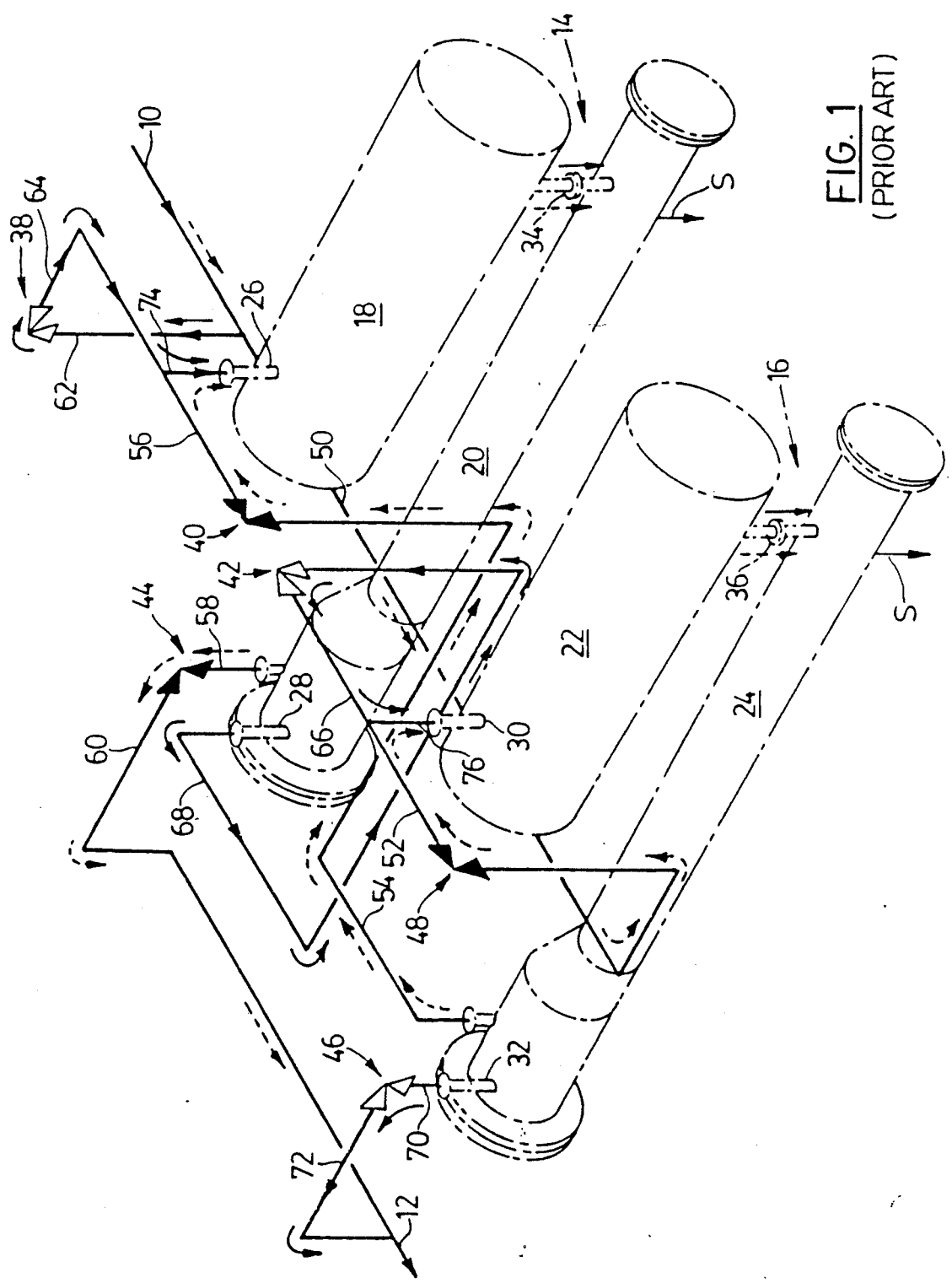
FIG. 1 is a diagrammatic illustration of a typical prior art apparatus.

FIG. 1 shows a typical sulphur recovery unit that might be used to treat a tail gas stream from an acid gas treatment unit (not shown). One function of the gas treatment unit is to ensure that at least substantially all sulphur containing compounds are in the form of hydrogen sulphide and sulphur dioxide.

A feed line from the acid gas treatment unit is indicated by reference numeral 10 and an exhaust line to a further waste gas treatment process is indicated at 12. The apparatus itself comprises two Claus catalytic converter and condenser sets indicated generally at 14 and 16. Each set comprises a converter containing a catalyst and a condenser downstream of the converter. The converter and condenser of the first set are indicated at 18 and 20 respectively while the corresponding converter and condenser of the second set are denoted 22 and 24. Each set has an inlet connection to the converter and an outlet connection from the condenser, the inlet and outlet for set 14 being indicated at 26 and 28 respectively while the inlet and outlet of set 16 are indicated at 30 and 32 respectively. Connections between each converter and the associated condenser are indicated respectively at 34 and 36. Elemental sulphur can be recovered from each condenser as indicated by the arrows denoted S.

The apparatus shown in the drawing includes six two-way switching valves denoted 38, 40, 42, 44, 46 and 48. Piping is indicated by solid lines. The gas may flow through either of two paths under steady state conditions, one of which is indicated by full line arrows (first path) and the other by dotted line arrows (second path). The first path is through valve 38, converter 18, condenser 20, valve 42, converter 22, condenser 24 and valve 46. At this time valves 38, 42 and 46 are open and valves 40, 44 and 48 are closed. The valves that are closed at this time are each represented as a pair of solid black triangles, while the open valves are shown as a pair of triangular outlines.

The second path is through valve 48, converter 22, condenser 24, valve 40, converter 18, condenser 20 and valve 44. At this time, valves 38, 42 and 46 are closed and valves 40, 44 and 48 are open.

When the gas is flowing in the first path, the catalyst in converter 18 will be undergoing regeneration while the other converter will be operating at a sub-dewpoint temperature for recovering sulphur. The reverse will happen during flow through the second path.

When the gas is flowing through the first path, the sections of pipe denoted as follows will contain stagnant gases: 50, 52, 54, 56, 58 and 60. When gas is flowing through the second path, the following sections of pipe will contain stagnant gases; 62, 64, 66, 68, 70 and 72.

It will be seen that, except for two very small sections denoted 74 and 76, all of the piping will contain stagnant gas at one time or another during the operation of the apparatus and will require heat tracing and insulation to prevent acid condensation.

As discussed previously, the process carried out in the installation of FIG. 1 may be enhanced by adding a third catalytic converter and condenser set. By using suitable piping incorporating nine two-way valves (as known in the art) the installation may be operated so that feed line (10) can be selectively connected to any one of the three catalytic converter and condenser sets for catalyst regneration in the converter of that set, and the gas leaving that set can be recirculated through the other two converters (which are operated at the dewpoint), before entering the exhaust line (12). The catalysts in the three converters can then be regenerated in turn by appropriately operating the valves of the installation.

DESCRIPTION OF THE PREFERRED EMBODIMENTS

Figure 2:
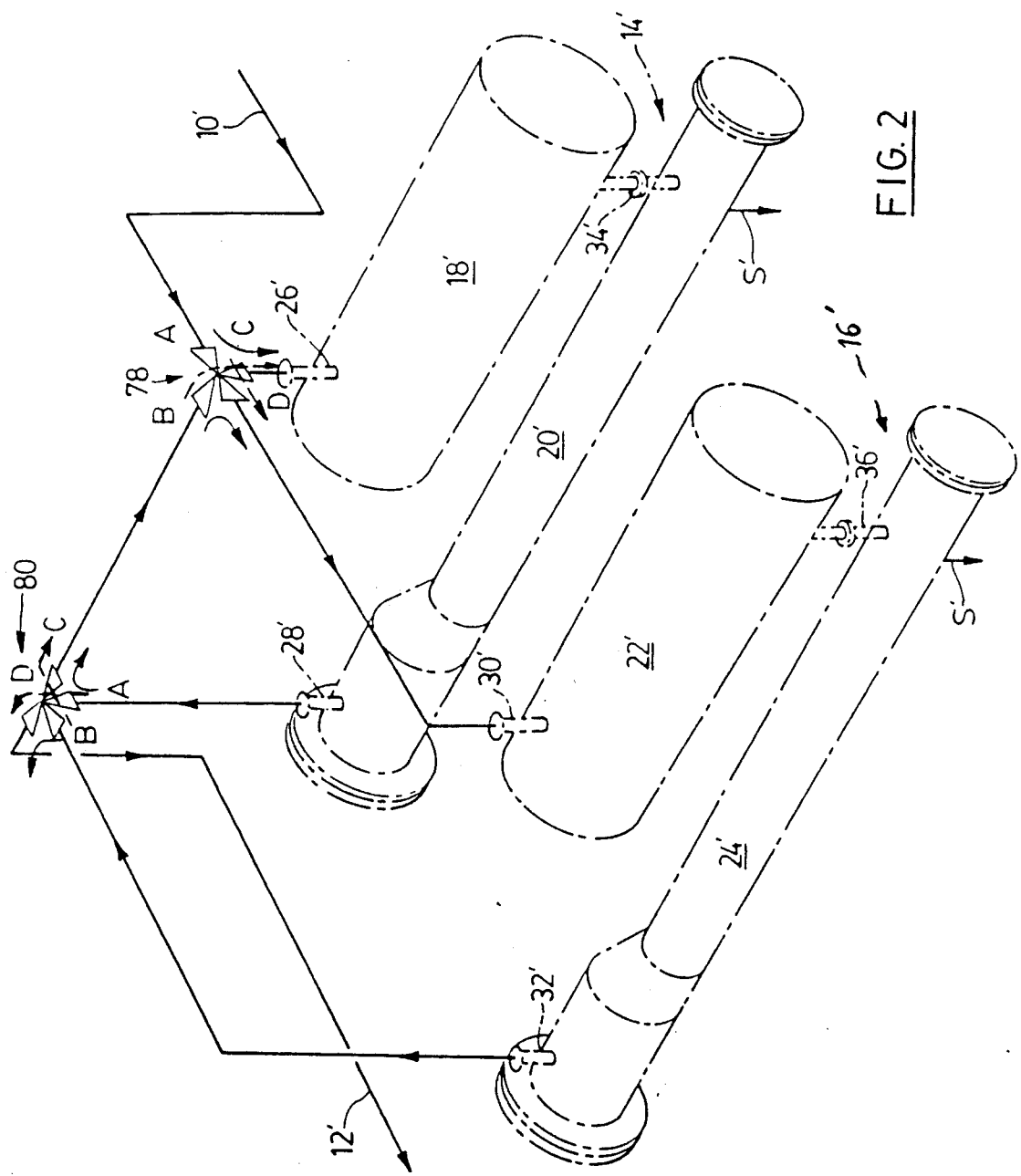
FIG. 2 is an illustration similar to FIG. 1 showing an apparatus of the form provided by the invention.

Referring now to FIG. 2, the same two converter and condenser sets are shown and are denoted by primed reference numerals corresponding to the reference numerals used in FIG. 1. However, in contrast to the arrangement of FIG. 1, the six two-way valves and associated piping have been replaced by two four-way valves. As will be explained, this arrangement eliminates any sections of piping which will contain stagnant gas and avoids the need for heat tracing of the piping.

Figure 6:
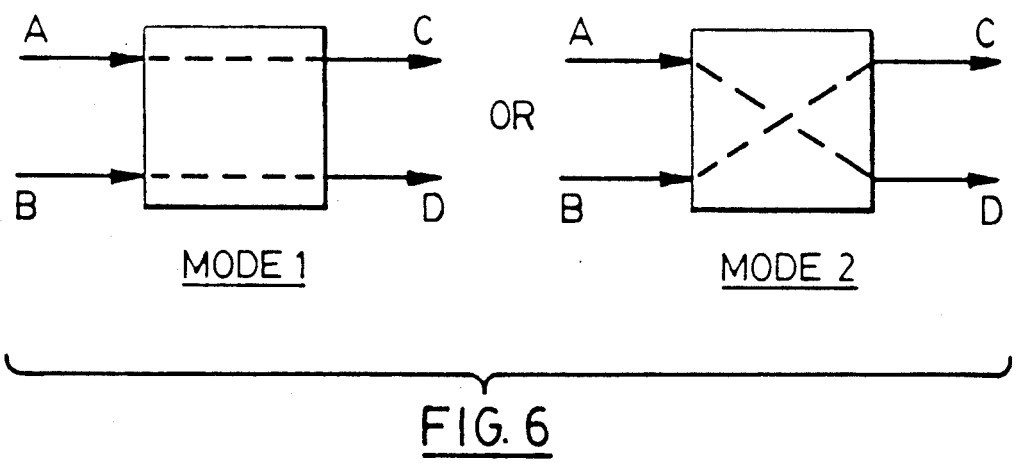
FIG. 6 comprises diagrammatic illustrations of the two positions of a typical switching valve as used in the apparatus of FIG. 2 or 5; and, FIG. 7 is a vertical sectional view through an actual valve.
Figure 7:
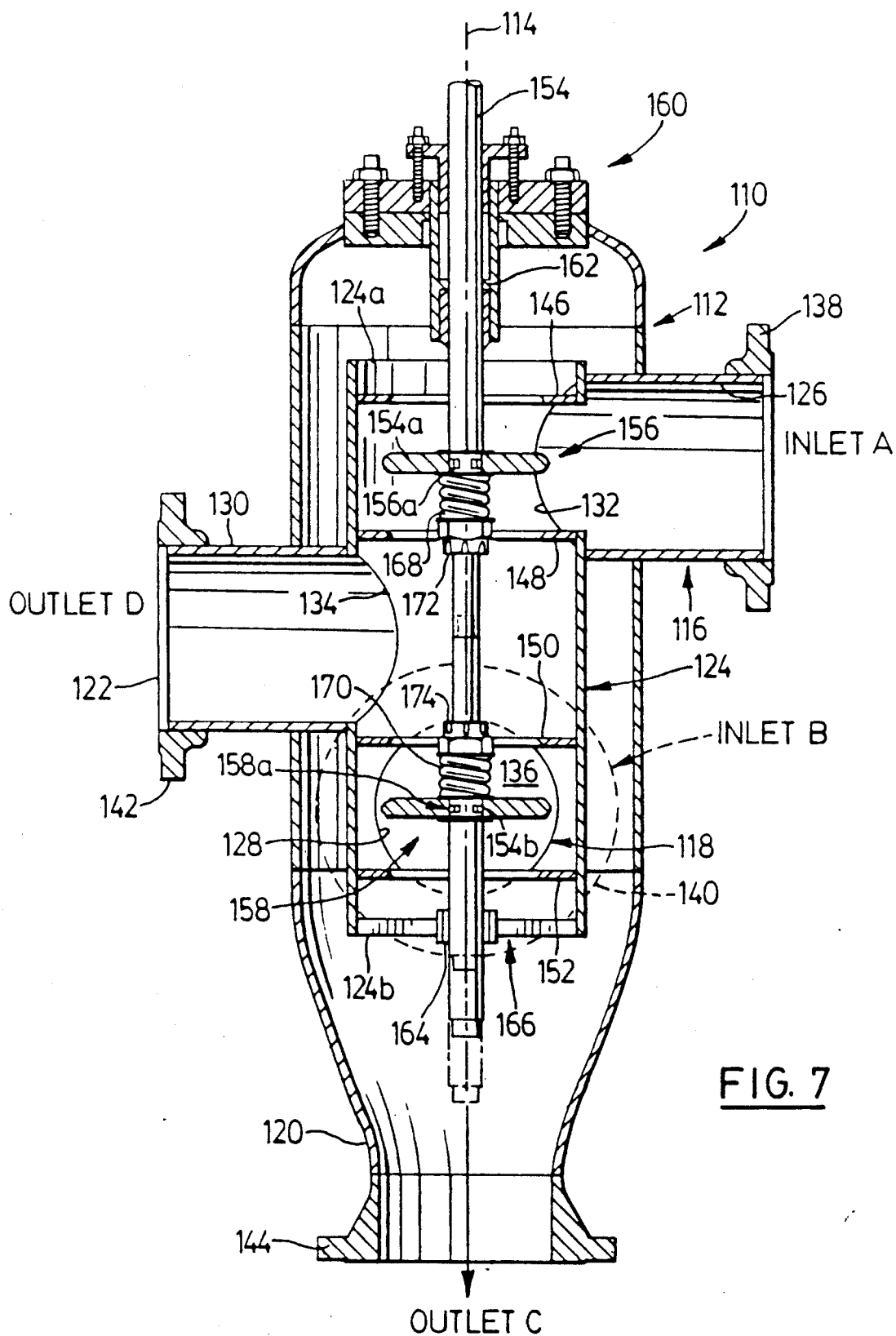

FIG. 6 diagrammatically illustrates one of the four-way valves and FIG. 7 is a vertical sectional view through a practical form of valve. Each valve has two inlets and two outlets, the two inlets being denoted A and B in FIG. 6 and the two outlets C and D. The valve provides two mutually isolated flow plaths through the valve from the inlets to the outlets. Each valve is switchable between the first position indicated in FIG. 6 as "Mode 1" in which each inlet is coupled to a defined outlet and a second position denoted "Mode 2", in which the outlets are reversed. In "Mode 1", inlet A is coupled to outlet C and inlet B is coupled to outlet D. In "Mode 2", the outlets have been reversed so that inlet A is connected to outlet D and inlet B is connected to oulet C.

Reverting to FIG. 2, the two valves are denoted by reference numerals 78 and 80 respectively and the inlets and outlets of the two valves are denoted as in FIG. 6. Again, two possible flow paths are provided for the gas. The first flow path is shown by the full line arrows and the second flow path by the dotted line arrows.

Assuming that valves 78 and 80 are both in the "Mode 1" position of FIG. 6, incoming gas from line 10' will enter inlet A of valve 78 and will leave through outlet C to converter 18' for regeneration of the catalyst in that converter. Vapourized sulphur from the catalyst will be carried with gas from converter 18' into condenser 20' and elemental sulphur will be removed at S'. From the outlet of converter and condenser set 14', gas leaving the outlet 28' of the first converter and condenser set will enter inlet A of valve 80 and will leave from outlet C. From outlet C, the gas will enter inlet B of valve 78 and will leave through outlet D of that valve and be delivered to the second converter 22', which will be operating at a sub-dewpoint temperature. Sulphur will be extracted from the gas stream in converter 22' and condensed from the gas stream in converter 24', leaving that condenser as elemental sulphur. Finally, the gas stream leaving the outlet 32' will enter inlet B of valve 80 and will leave through outlet D to the outlet line 12'.

When the catalyst in converter 22' is to be regenerated, both valves will be switched to their "Mode 2" positions. Incoming gas entering inlet A of valve 78 will then leave through outlet D and be delivered to the second converter and condenser set 16'. Gas from that set will then return to inlet B of valve 80 and leave through outlet C of that valve and enter valve 78 through inlet B. The gas will leave valve 78 through outlet C into converter 18' which at this time will be the converter operating at a sub-dewpoint temperature. Gas leaving outlet 28' of converter and condenser set 14' will enter inlet A of valve 80 and leave through outlet D to line 12'.

As indicated previously, at no time will any of the lines contain any stagnant gas. Accordingly, heat tracing will be unnecessary. Further, a single maintenance platform can be provided for accessing the two valves 78 and 80.

Figure 3:
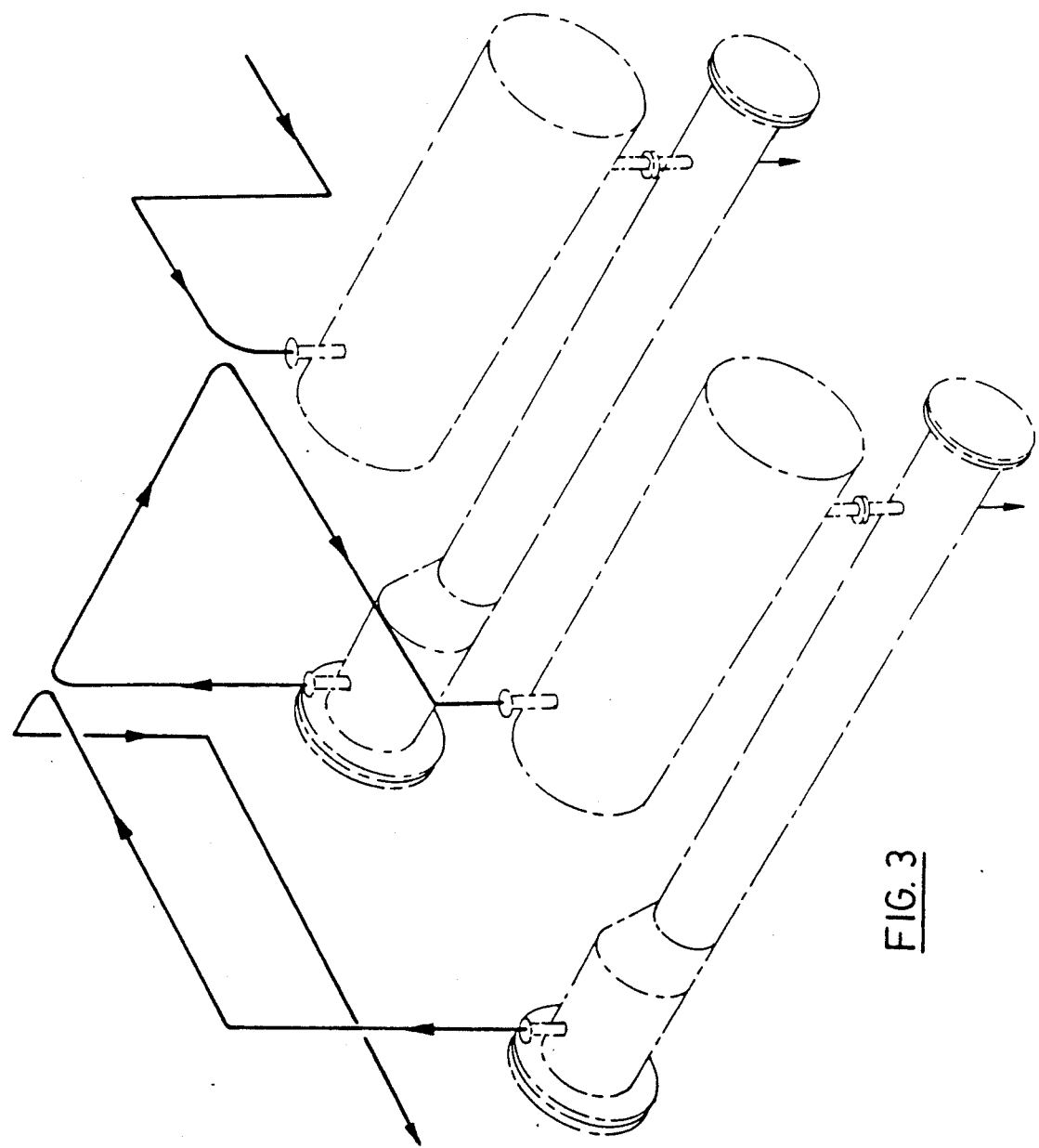
FIGS. 3 and 4 are views similar to FIG. 2 showing the two different gas flow paths that are achieved by the apparatus shown in FIG. 2.
Figure 4:
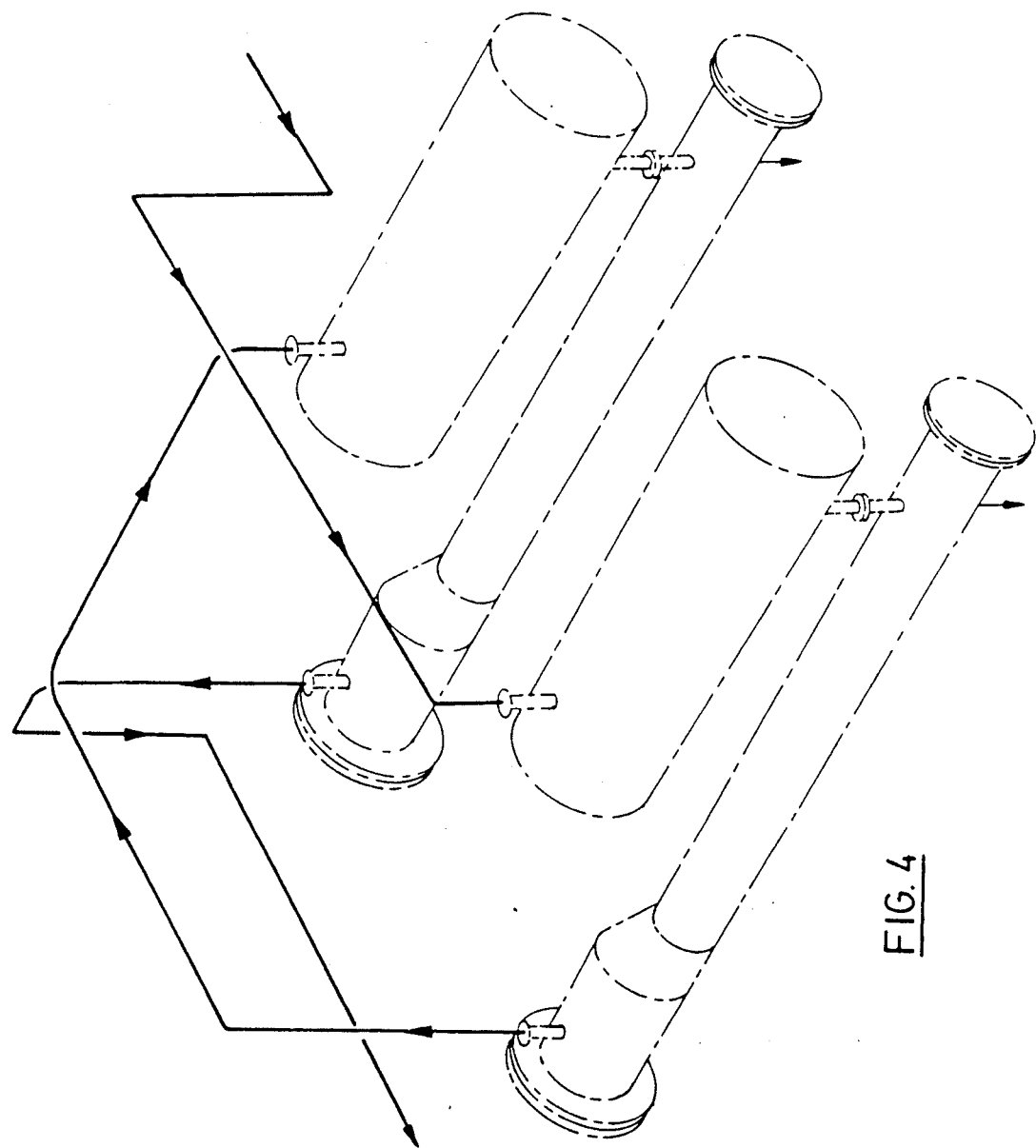

The two valves 78 and 80 have been omitted from FIGS. 3 and 4, which show the two flow paths separately.

Figure 5:
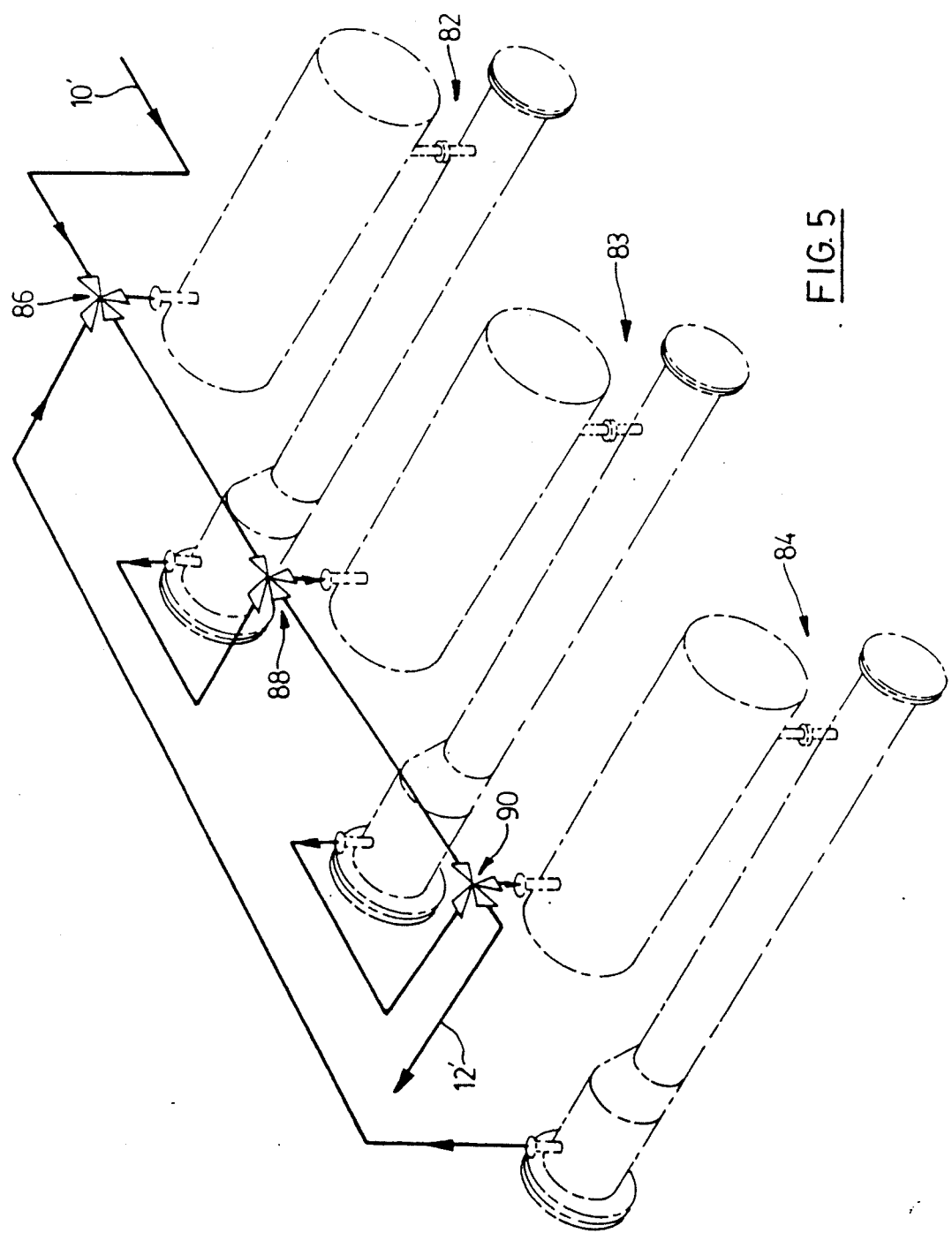
FIG. 5 is a view similar to FIG. 2 but showing an apparatus having three converter and condenser sets.

FIG. 5 shows an apparatus similar to that of FIGS. 2, 3 and 4, but having three converter and condenser sets, each set having associated therewith a four-way switching valve. The respective converters and condenser sets are denoted 82, 83 and 84, while the respective valves are denoted 86, 88 and 90. As noted previously, the apparatus can be operated in three different modes in each of which the feed line is connected to a selected one of the converter and condenser sets for catalyst regeneration in the converter in that set while the gas leaving that set is circulated through the other two converters (operating at the dewpoint) before entering the exhaust line of the apparatus.

In the first mode, the incoming gas flows from gas stream 10' along a first path through valve 86, converter and condenser set 82, valve 88, converter and condenser set 83, valve 90, converter and condenser set 84 and then back through valve 86, valve 88 and valve 90 to exhaust line 12'. The second path is through valve 86, valve 88, valve 90, converter and condenser set 84, valve 86, converter and condenser set 82, valve 88, converter and condenser set 83 and valve 90. The third path is through valve 86, valve 88, converter and condenser set 84, valve 86, converter and condenser set 82, valve 88 and valve 90.

As in the preceding embodiment, at no time will any of the lines contain any stagnant gas. Accordingly, heat tracing will be unnecessary.

While it may be possible to obtain suitable four-way switching valves from normal commercial sources, a four-way switching valve that can be used as the valve 78 and 80 forms the subject of U.S. Pat. No. 4,842,016 (McKenzie). FIG. 7 is a vertical sectional view through this valve and will now be described.

The valve itself is generally indicated by reference numeral 110 and has a generally cylindrical casing 112 that extends about an axis 114. The valve has two inlets 116 and 118 denoted respectively as "inlet A" and "inlet B" and two outlets 120 and 122 denoted as "outlet C" and "outlet D". As discussed previously, the valve can adopt either of two positions referred to as "mode 1" and "mode 2". In mode 1 inlet A is connected to outlet C and inlet B is connected to outlet D, while in mode 2 the outlets are reversed. As drawn, the valve is in an intermediate, transitional position between the positions of mode 1 and mode 2.

Disposed concentrically within casing 112 and extending about axis 114 is an inner hollow member 124 of cylindrical shape. Member 124 defines an internal chamber having open opposite ends 124a and 124b. The inlets 116 and 118 and outlet 122 are formed by respective tubular members 126, 128 and 130 that extend inwardly through the outer casing 112 and are joined to the inner cylindrical member at openings in its wall forming first, second and third ports (denoted respectively 132, 134 and 136) spaced along axis 114.

At their outer ends, the tubular members have respective flanges 138, 140 and 142 for connection to external pipework. Casing 112 is open at its lower end and forms outlet 120. In this particular embodiment, the lower end portion of the casing is flared inwardly because the opening from outlet 120 is required to be narrower than the diameter of the casing (although this is not of course essential). A connection flange 144 is provided for outlet 120.

Four valve seats are provided inside cylindrical member 124 and are arranged in pairs respectively above and below each of the first and third ports 132 and 136. The upper pair of valve seats above and below port 132 are denoted respectively as 146 and 148 while the corresponding valve seats for port 136 are denoted 150 and 152.

Disposed on axis 114 and extending inwardly through the upper end of casing 112 and through the cylindrical member 124 is a valve stem 154 that carries two disc-shaped valve seals 156 and 158 disposed respectively between the two pairs of valve seats 146, 148 and 150, 152.

A conventional packing gland generally denoted 160 is provided at the top of the casing around the valve stem 154. This packed gland can be equipped with jacketing with heating coil or graphite lubricant through a latern ring in the packing if required in service. The gland is also equipped with a cast-iron scrapper bushing 162 which acts as a stem guide and also as a scraper for remvoing deposits on the stem which would deteriorate the packing in service. The lower end portion of the valve stem 154 is guided by a cast-iron bushing 164 supported at the lower end of the cylindrical member 124 by a spider denoted 166.

The two valve seals 156, 158 are biassed outwardly against shoulders 154a, 154b on stem 154 by respective springs 168, 170. The springs in turn react against respective nuts 172 and 174 that are screw-threaded onto stem 154. This arrangement allows "thermal growth" permitting the valve discs to seal even when the valve stem elongates due to thermal expansion.

Fluid leakage through the seals 156, 158 where the valve stem passes through is prevented with the use of metal-to-metal piston ring type seals generally indicated at 156a, 158a. Two rings are employed positioned one inside the other with the ring splits located 180° apart. This configuration greatly reduces the amount of leakage due to the labyrinth sealing effect.

The valve seals and seats are of what might be termed "plug-line" contact crushing type. In other words, the seals in effect plug the seats to form a closure. At the same time, the seals have slightly convex surfaces where they contact the seats so that in fact line contact is established, as opposed to face-to-face surface contact. The seals have the effect of crushing any particles that might accumulate on the seats. In alternative embodiments, the valves could be designed for knife-edge type seats or shearing-type seats.

Stroking of the valve stem 154 can be accomplished manually or by suitable power actuator means (e.g. pneumatic). Upward vertical movement of the valve stem from the position shown will bring the two valve discs into contact with the upper valve seats 146 and 150 respectively. Fluid entering inlet A will then flow into the interior of the cylindrical member 124 and out through outlet D. At the same time, the fluid entering inlet B will flow downwardly and out of the lower end of cylindrical member 124 and through outlet C. Downward vertical movement of the valve stem 154 to bring the valve discs into contact with the seats 148 and 152 will in effect reverse the outlets. Fluid entering through inlet A will then flow upwardly through valve seat 146 and into the space between the exterior of the cylindrical member 124 and the casing. The fluid will then flow downwardly in the space and out of outlet C. The fluid entering through inlet B will flow upwardly in the cylindrical member and out of outlet D.

It will of course be understood that the preceding description relates to a particular preferred embodiment of the invention and that modifications are possible within the broad scope of the invention. Some possible modifications have been indicated previously and others will be apparent to a person skilled in the art.

In some instances the valves may be re-positioned without affecting their function. For example, in the embodiment of FIG. 2, valve 80 could be re-positioned above the inlet 30' of the converter 22'. One inlet of valve 80 would then be connected to outlet D of valve 78 while the other inlet would be connected to outlet 28' of condenser 20'. One outlet of valve 80 would go to exhaust, and the other to converter inlet 30'. Condenser outlet 32' would be connected to inlet B of valve 78. In this configuration, the piping layout is somewhat more similar to the layout of FIG. 5 than the layout actually shown in FIG. 2.

I claim:

1. Apparatus for recovering elemental sulphur by the sub-dewpoint Claus process, comprising:
   at least two Claus catalytic converter and condenser sets, each set comprising a converter containing a catalyst and a condenser, each set having an inlet connection to the converter and an outlet connection from the condenser;
   in association with each said converter and condenser set, a respective two-position four-way switching valve having two inlets and two outlets and providing two mutually isolated flow paths between said switching valve inlets and outlets, each said valve being switchable between a first position in which each inlet is connected to a defined one of said outlets, and a second position in which the connections between the inlets and outlets are reversed;
   inlet means for a hydrogen sulphide-containing gas stream from which elemental sulphur is to be recovered, said stream being at a consistently high temperature sufficient to vapourize sulphur condensed on said catalysts, for re-generation of the catalysts, said inlet means being coupled with a first inlet of a first one of said switching valves, a first outlet of a second one of said switching valves communicating with exhaust means; and,
   piping coupling said converter and condenser sets and valves so that said first valve can be set to deliver gas selectively through either one of its outlets to the inlet connection of a selected one of said converter and condenser sets, the converter catalyst of which is to be re-generated by said high temperature gas stream, while the second valve can be set to receive gas selectively through either of its inlets from the outlet connection of either of the converter and condenser sets, and to deliver gas through said first outlet of said second switching valve to said exhaust means or through the other of its outlets to the second inlet of said first valve;
   whereby, with each said valve set to a respective defined one of said first and second positions, said gas stream is delivered to a first one of the converter and condenser sets for regenerating the catalyst in the converter and is subsequently delivered to a second said set for recovery of elemental sulphur, and with each said valve set to the other position, gas circulation through the said converter and condenser set is reversed with no stagnant gas being allowed to accumulate within the apparatus.

2. An apparatus as claimed in claim 1, which includes two catalytic converter and condenser sets, wherein said first valve has a first one of said inlets connected to said gas stream inlet means, and each outlet connected to the inlet connection of one of said converter and condenser sets, and wherein said second valve has each inlet connected to the outlet connection from one of said converter and condenser sets, has one outlet connected to exhaust and the other outlet connected to the second inlet of the first valve.

3. An apparatus as claimed in claim 1, having first, second and third catalytic converter and condenser sets and associated first, second and third two-position four-way switching valves, wherein said first valve has a first inlet connected to said gas stream inlet means, a first outlet connected to the inlet connection of said first catalytic converter and condenser set, and a second outlet connected to a first inlet of said second valve, said second valve having its second inlet connected to the outlet connection of the first converter and condenser set, having a first inlet connected to inlet connection of the second converter and condenser set, and a second outlet connected to the first inlet of the third valve, said third valve having its second inlet connected to the outlet connection of the second converter and condenser set, having its first outlet connected to the inlet connection of the third converter and condenser set, and its second outlet connected to exhaust, the outlet connection of the third converter and condenser set being connected to the second inlet of the first valve.

4. An apparatus as claimed in claim 1, wherein each said two-position four-way switching valve comprises:
   a hollow member defining an internal chamber having open opposite ends;
   first, second and third ports in a wall of said member, said ports being spaced along a defined axis;
   a valve stem disposed on said axis and supported for movement along said axis;
   in association with each of said first and third ports, a valve seal carried by said stem and disposed between a pair of valve seats within said hollow member, the seats in each pair being disposed on opposite sides of the associated port and being co-operable with the valve member for preventing fluid flow along said member, the valve seals and seats being arranged so that, in a first axial position of said valve stem, the two seals co-operate with the valve seats in the respective pairs closest to a first said end of the hollow member, and in a second axial position of the valve stem, said seals co-operate with the valve seats in the respective pairs closest to the opposite said end of the hollow member;

wherein said valve seals are designed to form plugs for sealing with said seats, each seal comprising a seal disc slidably mounted on said valve stem, the seal discs being spring biassed outwardly against respective shoulders on said stem so as to permit sealing to be achieved while accommodating dimensional variations due to thermal changes; and, a piston ring-type seal between each said valve disc and the valve stem.

* * * * *